(12) United States Patent
Beakley (10) Patent No.: US 7,026,731 B2
(45) Date of Patent: Apr. 11, 2006

(54) LINEAR MOTOR GLIDE ASSEMBLY

(75) Inventor: Bruce Beakley, Houston, TX (US)

(73) Assignee: Parker Hannifin Corp., Cleveland, OH (US)

( * ) Notice: Subject to any disclaimer, the term of this patent is extended or adjusted under 35 U.S.C. 154(b) by 0 days.

(21) Appl. No.: 10/600,735

(22) Filed: Jun. 20, 2003

(65) Prior Publication Data

US 2004/0256918 A1  Dec. 23, 2004

(51) Int. Cl.
*H02K 41/00* (2006.01)
(52) U.S. Cl. ........................................................ 310/12
(58) Field of Classification Search ............. 310/12–14
See application file for complete search history.

(56) References Cited

U.S. PATENT DOCUMENTS

| | | | | |
|---|---|---|---|---|
| 4,506,180 A | * | 3/1985 | Shizuka et al. | 310/91 |
| 4,633,112 A | * | 12/1986 | Miyake | 310/90 |
| 4,774,442 A | * | 9/1988 | Teramachi | 318/135 |
| 6,040,649 A | * | 3/2000 | Horng | 310/91 |
| 6,281,644 B1 | * | 8/2001 | Komatsu et al. | 318/38 |
| 6,495,934 B1 | * | 12/2002 | Hayashi et al. | 310/12 |
| 6,495,935 B1 | * | 12/2002 | Mishler | 310/12 |
| 6,724,104 B1 | * | 4/2004 | Katsuki et al. | 310/12 |
| 6,777,832 B1 | * | 8/2004 | Watanabe | 310/12 |

\* cited by examiner

*Primary Examiner*—Darren Schuberg
*Assistant Examiner*—Judson H. Jones
(74) *Attorney, Agent, or Firm*—Patrick Stellitano (57) ABSTRACT

The present invention provides a linear motor and glide assembly for mounting a linear motor employing a unitary bearing rail structure and further providing heat compensation and compensation for thermal expansion, with further compensation provided to substantially reduce cogging.

17 Claims, 11 Drawing Sheets

LINEAR MOTOR GLIDE ASSEMBLY

TECHNICAL FIELD OF THE INVENTION

The present invention relates to the field of linear motors and methods and apparatus for mounting them.

BACKGROUND OF THE INVENTION

Linear motors are used in a variety of applications, including automated positioning systems, robotics, hard drives, semiconductor manufacturing, and electronic assembly. A description of linear motor construction and operation is provided in U.S. Pat. No. 4,839,543, issued to Trilogy Systems Corporation., which is incorporated herein by reference. A position encoder system for positioning linear motors is described in U.S. Pat. No. 6,326,908, also issued to Trilogy Systems Corporation, and also incorporated herein by reference.

Figure 1A:
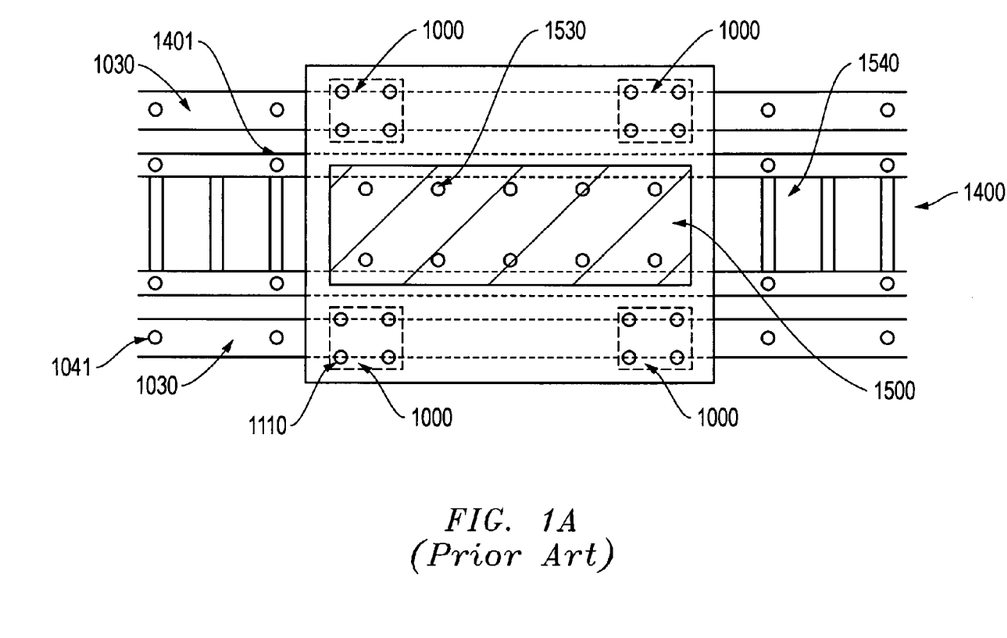
FIG. 1A is a top view of a conventional method for mounting a linear motor.
Figure 1B:
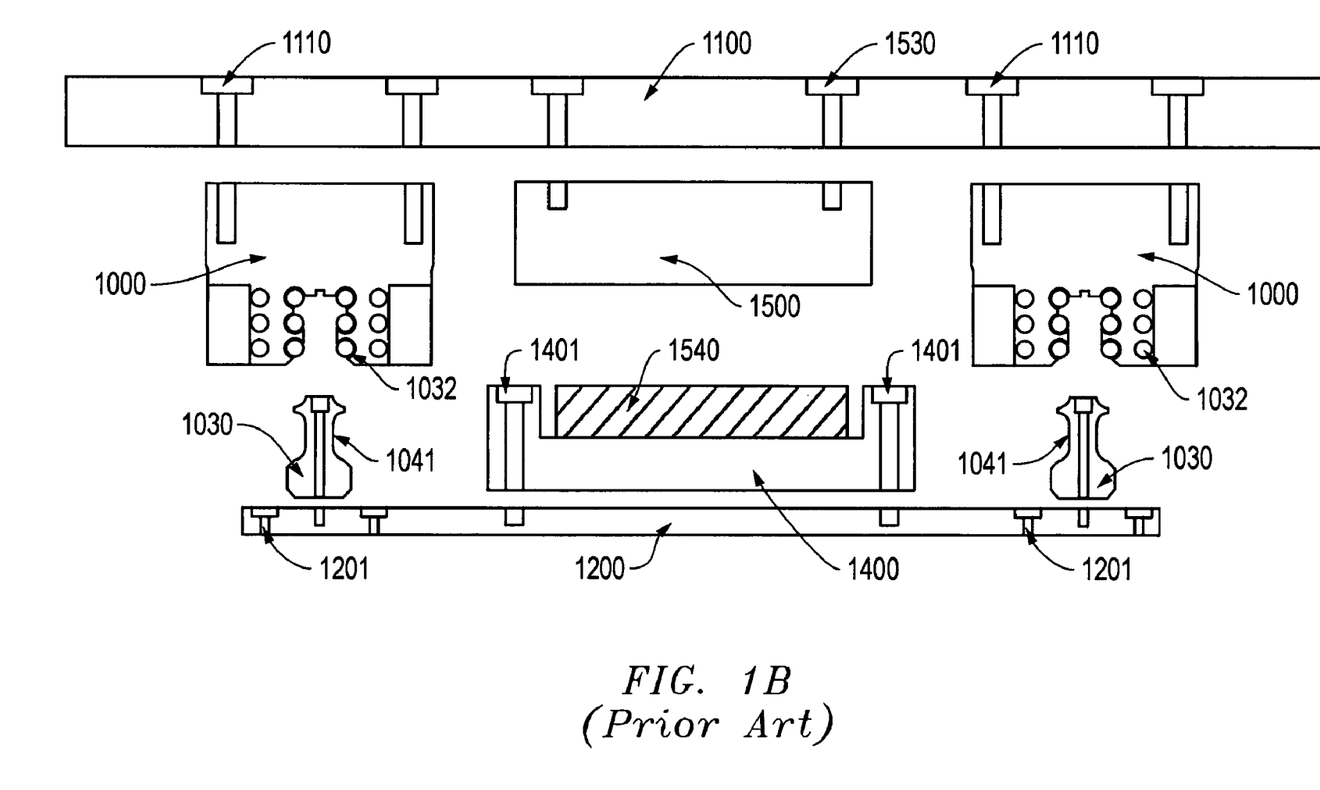
FIG. 1B is a front cross-sectional view of a conventional method for mounting a linear motor.

Shown in FIG. 1A is a top view, and shown in FIG. 1B is an end cross-sectional view, of a conventional glide assembly for mounting a linear motor. Linear motor coil assembly 1500, which may be a slotless or an iron core motor assembly, is affixed to a plate 1100 by way of screws inserted into a plurality of screw holes 1530. Plate 1100 serves to conduct heat away from assembly 1500 and also serves to mount bearing block assemblies 1000 using bolts inserted into bolt holes 1110. Bearing block assemblies 1000 comprise roller bearings 1032 that roll against bearing rails 1030. Bearing rails 1030 are secured to a base plate 1200 by bolts inserted into a plurality of bolt holes 1041. The base plate 1200 may be secured to a fixed structure with bolts inserted into a plurality of bolt holes 1201. Also secured to base plate 1200 by bolts inserted into a plurality of bolt holes 1401 is a magnet support structure 1400, which supports a linear array of magnets 1540. Mounted to the linear motor coil assembly 1500 is a connector assembly (not shown) which enables current to be coupled to the coils of the motor. Also not shown, are sensors for detecting the position of the motor as described in U.S. Pat. No. 6,326,908.

The conventional glide assembly construction shown in FIGS. 1A and 1B presents several disadvantages. First, the assembly occupies a large volume of space. Second, the cost of the numerous parts comprising the assembly can be expensive. Weight is also a disadvantage. A simpler, less costly, lighter assembly is desired.

Thus, there is a need for an invention that overcomes limitations of the prior art.

SUMMARY OF THE INVENTION

The present invention overcomes prior art limitations by providing a unitary bearing rail structure that simultaneously serves to provide a linear bearing surface for a linear motor and support for an array of magnets for the motor. Further, a mechanism is provided to compensate for thermal expansion to maintain contact between bearings and the rail structure without substantially constraining the motion of the motor.

According to one aspect of the invention, a unitary bearing rail structure provides two bearing rails that exhibit surfaces along which bearings roll to enable linear motion of the motor with low friction. Between the rails of the unitary bearing rail structure a surface provides support for magnets comprising the linear motor. This unitary bearing rail structure eliminates the need to assemble a plurality of parts to construct parallel bearing rails for a linear motor. Additionally, the bearing rail structure of the present invention can be manufactured to weigh less and occupy less space than the conventional bearing rail assemblies of the prior art. Cost is also reduced.

According to another aspect of the invention, thermal compensation is provided to compensate for thermal expansion of the coil assembly of the linear motor and to conduct heat away from the linear motor. Thermal compensation is provided using connecting structures that connect to the linear motor coil assembly and to bearing block assemblies. The connecting structures serve to conduct heat away from the linear motor coil assembly.

According to yet another aspect of the invention, using a connecting structure with a low coefficient of thermal expansion enables the bearings of the bearing block assemblies to maintain substantially low-friction contact with the bearing rails of the bearing rail structure. A difference in thermal expansion between the linear motor coil assembly and a connecting structure is accommodated by providing a clearance for bolt heads to move perpendicular to a direction of thermal expansion. Moreover, adjustability is provided to establish continuous low-friction contact between the bearings of the bearing block assemblies and the surfaces of the bearing rails of the bearing rail structure.

According to yet another aspect of the invention, position indication marks are provided along the length of the bearing rail structure to facilitate position indication. Thus, an array of position indication marks may be scored into a surface of the bearing rail structure along its length or be provided using an optical strip. Then, sensors mounted to an end of the linear motor coil assembly or as a separate assembly may be employed to generate a signal with respect to the position indication marks. These signals can be processed to indicate position.

According to yet another aspect of the invention, compensation is provided to substantially reduce the phenomenon of cogging, which is an undesirable cyclical resistance to motion of the linear motor. An anti-cogging assembly, mounted to the linear motor coil assembly, substantially diminishes this resistive force. Further, an anti-cogging assembly may be electrically connected to circuitry that enhances the anti-cogging effect.

The foregoing has outlined rather broadly aspects, features and technical advantages of the present invention in order that the detailed description of the invention that follows may be better understood. Additional aspects, features and advantages of the invention will be described hereinafter. It should be appreciated by those skilled in the art that the disclosure provided herein may be readily utilized as a basis for modifying or designing other structures for carrying out the same purposes of the present invention. Persons of skill in the art will realize that such equivalent constructions do not depart from the spirit and scope of the invention as set forth in the appended claims, and that not all objects attainable by the present invention need be attained in each and every embodiment that falls within the scope of the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 2:
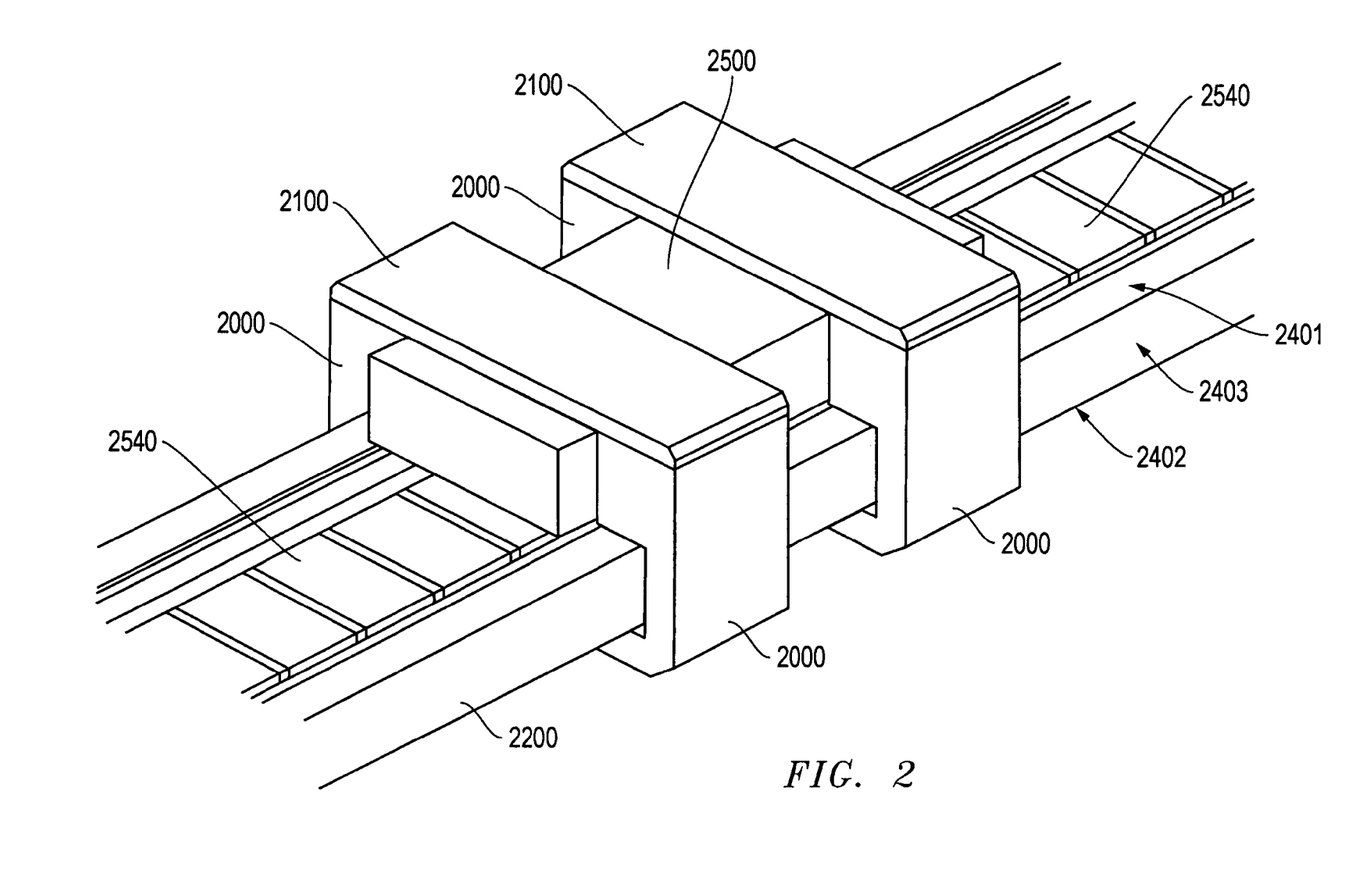
FIG. 2 is a simplified perspective view of a preferred embodiment of the present invention.

A simplified perspective view of a preferred embodiment of the present invention is shown in FIG. 2. A linear motor coil assembly 2500 is moveable over a linear array of magnets 2540 to provide controllable linear motion. Affixed to coil assembly 2500 are two thermal compensators 2100 to compensate for thermal expansion arising from heat generated within coil assembly 2500, as will be explained further. Each thermal compensator 2100 is affixed to a separate one of two pairs of bearing block assemblies 2000, each one of a pair of bearing block assemblies being positioned on opposite sides of coil assembly 2500. Within each one of the four bearing block assemblies are three bearings or cam followers (not shown in FIG. 2) which roll against surfaces 2401, 2402, and 2403 of two opposite rails of bearing rail structure 2200.

Figure 3:
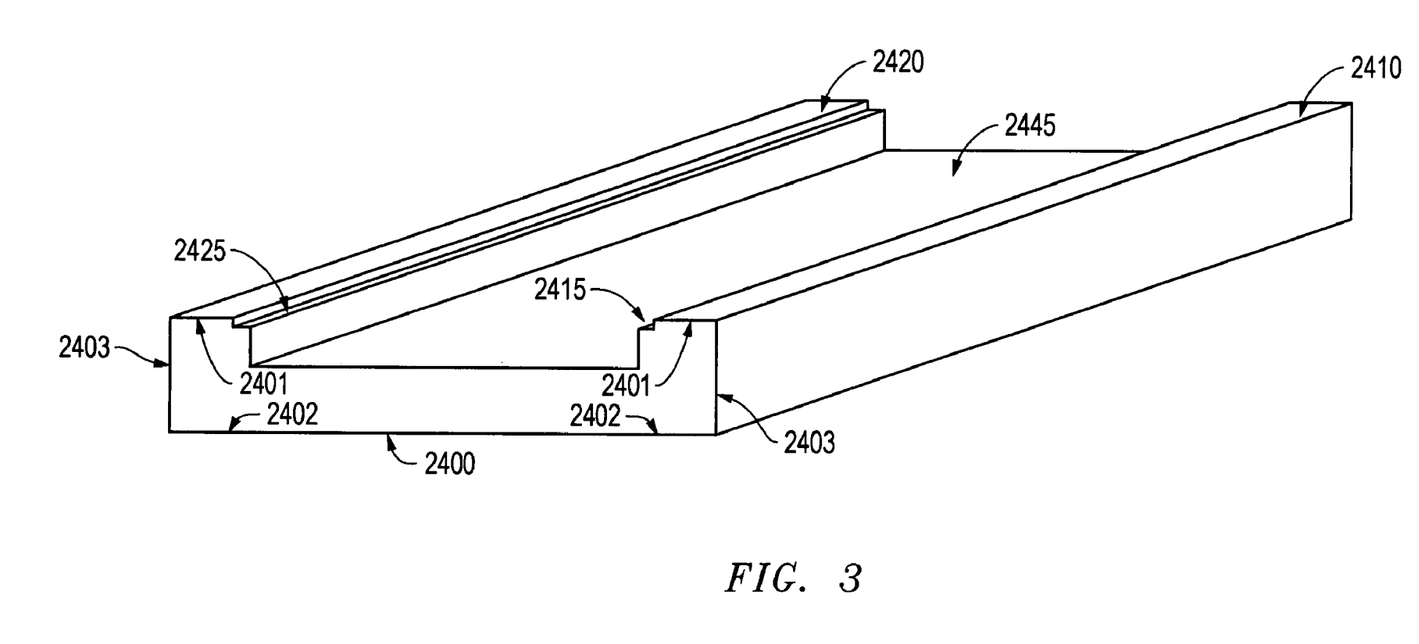
FIG. 3 is a perspective view of a combined bearing rail and magnet support structure of the present invention.

Shown in FIG. 3 is a perspective view of bearing rail structure 2400. On each side of rail structure 2400 is a bearing rail 2410, 2420. As just noted, each bearing rail 2410, 2420 presents surfaces 2401, 2402, and 2403 to cam followers mounted to bearing block assemblies 2000, that enable linear motor coil assembly 2500 to move linearly along bearing rail structure 2400. Also, each bearing rail presents ledges 2415 and 2425 for mounting a stainless steel shim to cover magnets 2540, as is shown in FIG. 4.

Figure 4:
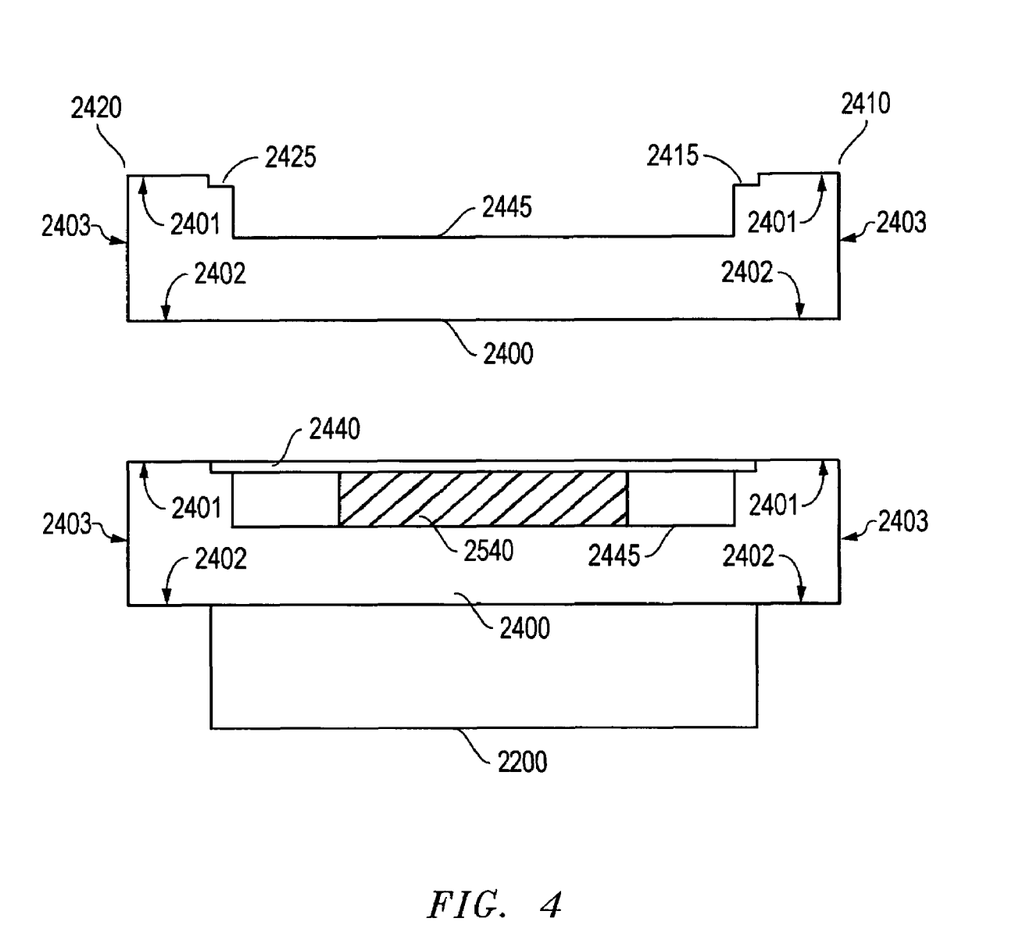
FIG. 4 is a front cross sectional view of a combined bearing rail and magnet support structure with magnets and stainless steel shim.

FIG. 4 shows an end-cross-sectional view of bearing rail structure 2400 with surfaces 2401, 2402 and 2403 presented by each bearing rail 2410 and 2420. Each bearing rail also presents a ledge 2415 and 2425, respectively. Mounted on both ledges 2415 and 2425 is a stainless steel shim 2440, which covers magnets 2540 positioned upon a surface 2445 of bearing rail structure 2400. Bearing rail structure 2400 is secured to a base plate 2200. Thus, bearing rail structure 2400 provides a unitary structure that combines the functions of providing bearing rails and providing a surface upon which is disposed a linear array of magnets.

Figure 5:
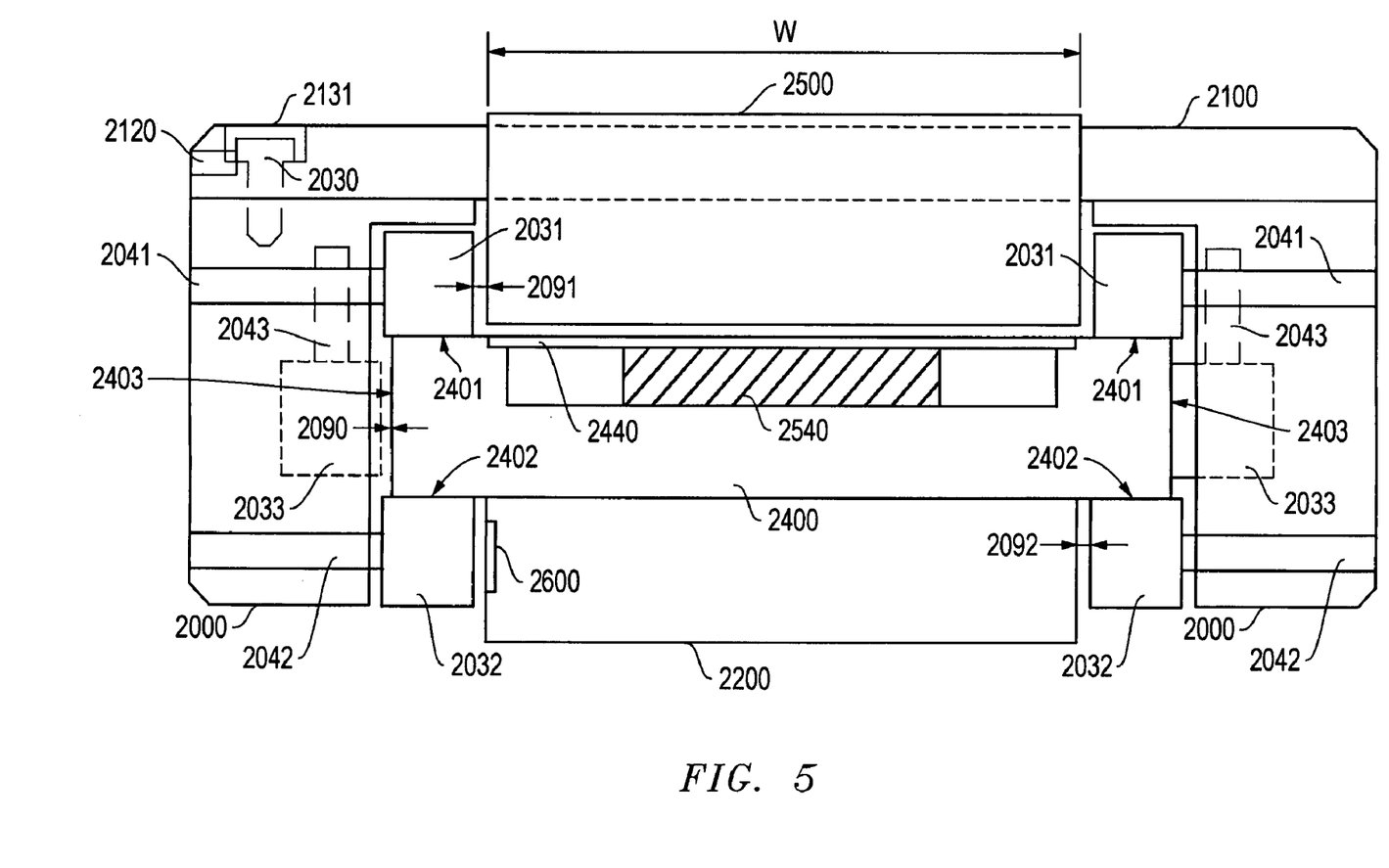
FIG. 5 is a front end cross sectional view of an embodiment of the glide assembly of the present invention for mounting a linear motor.

A more detailed end-cross-sectional view of the assembly shown in FIG. 2 is shown in FIG. 5. Affixed to coil assembly 2500 is a thermal compensator 2100. Mounted at each end of thermal compensator 2100 are bearing block assemblies 2000. A bearing block assembly 2000 comprises 3 cam followers 2031, 2032, and 2033. Cam followers 2031, 2032 and 2033 are mounted to shafts 2041, 2042, and 2043, respectively. In the embodiment shown in FIG. 5, base plate 2200 comprises a position indicator strip 2600, which enables sensors to determine the position of the linear motor along the linear track provided by the glide apparatus of the present invention. In particular, the position indicator strip may comprise an optical grating. The optical grating may be implemented using a commercially available optical or magnetic grating "tape" applied to the surface of base plate 2200, or alternatively, an optical grating may be "scored" into the surface of bearing rail 2401 or the stainless steel shim cover 2440 using a precision laser cutting apparatus.

The cam followers are position-able to roll against and along surfaces 2401, 2402, and 2403 of bearing rail structure 2400, respectively. Thus, bearing rail structure 2400 is a unitary structure that serves the dual functions of providing a surface upon which the linear array of magnets 2540 is disposed and of exhibiting surfaces against which bearings are position-able. This enables a simpler construction than the conventional method of providing one structure for mounting the magnets and a second set of separate rails for the glide assembly. With the construction provided by the present invention the entire assembly is easier to assemble, is lighter in weight, occupies less volume, and costs less.

In one embodiment, coil assembly 2500 comprises coils enclosed in an aluminum housing. A material such as aluminum is preferable because of its low cost, low weight and ability to conduct heat away from the coils. However, when temperature increases, due to heat generated by current in the coils, aluminum expands significantly. A nominal coefficient of linear thermal expansion for aluminum is $13.3 \times 10^{-6}$ inches per inch of length per degree Fahrenheit (F) increase in temperature. A typical operating temperature range is 72 to 212 degrees F.; that is, a change in temperature of 140 F. Suppose that at 72 degrees F. the width W of coil assembly 2500 is 2.756 inches. Then, at 212 degrees F., coil assembly 2500 will have expanded by $140 \times 2.756 \times 13.3 \times 10^{-6} = 0.00513$ inches. The width of coil assembly 2500 would then be $2.756 + 0.00513 = 2.7611$ inches.

Care must be taken, therefore, to construct the apparatus of the present invention to ensure that when coil assembly 2500 expands, that cam followers 2031, 2032 and 2033 are not constrained, thereby ensuring smooth motion along bearing rail structure 2400. For example, referring to FIG. 5, a gap 2091 of sufficient width is provided to ensure that when coil assembly 2500 expands, it will not contact and constrain cam followers 2031. Conversely, if bearing block assemblies were mounted to coil assembly 2500 in such a way that the bearing blocks moved outward, away from bearing rail structure 2400, as coil assembly 2500 expanded, then cam followers 2033 might be brought away from contact with surface 2403 of bearing rail structure 2400, leaving an undesired gap 2090. The present invention provides a way to overcome this problem.

In a preferred embodiment of the invention a thermal compensator 2100 is affixed to coil assembly 2500 and the bearing block assemblies 2000 are mounted to thermal compensator 2100. Compensator 2100 is made of a material, such as Invar, that exhibits a relatively low linear coefficient of thermal expansion. For example, Invar 36 alloy, available from National Electronic Alloys Inc., (www.nealloys.com), exhibits a thermal expansion coefficient of $0.9 \times 10^{-6}$ inches per inch per degree Fahrenheit in the temperature range of 0 to 350 degrees Fahrenheit Thus, the thermal coefficient of expansion of Invar is very small compared to aluminum. For example, a 2.756-inch length of Invar at 72 degrees F. would expand by $140 \times 2.756 \times 0.0167 \times 10^{-6} = 0.000347$ inches when the temperature increases to 212 degrees F. This amount of expansion is insubstantial.

Thus, when bearing block assemblies 2000 are mounted to a thermal compensator made of Invar, which exhibits substantially no expansion for a typical operating temperature range, the position of the bearing blocks, and consequently the cam followers, will not substantially change when temperature changes. In the preferred embodiment shown in FIG. 5, the bearing blocks 2000 are mounted to compensator 2100 to ensure that no gap 2090 exists when coil assembly 2500 expands to its maximum extent for a given operating temperature range.

At one end, bearing block assembly 2000 is mounted to thermal compensator 2100 by bolts 2030 that are positioned within holes 2131. The position of a bolt 2030 is laterally adjustable by a setscrew 2120 in compensator 2100 to enable adjustment of the position of a cam follower 2033 to facilitate contact of cam followers 2033 against surfaces 2403 of bearing rail structure 2400. The force of the contact of cam followers 2033 against bearing rail surfaces 2403 can therefore be adjusted as desired, and will be substantially maintained since, by virtue of thermal compensation provided by thermal compensators 2100, lateral movement of bearing block assemblies 2000 as a function of temperature is insubstantial.

Figure 6:
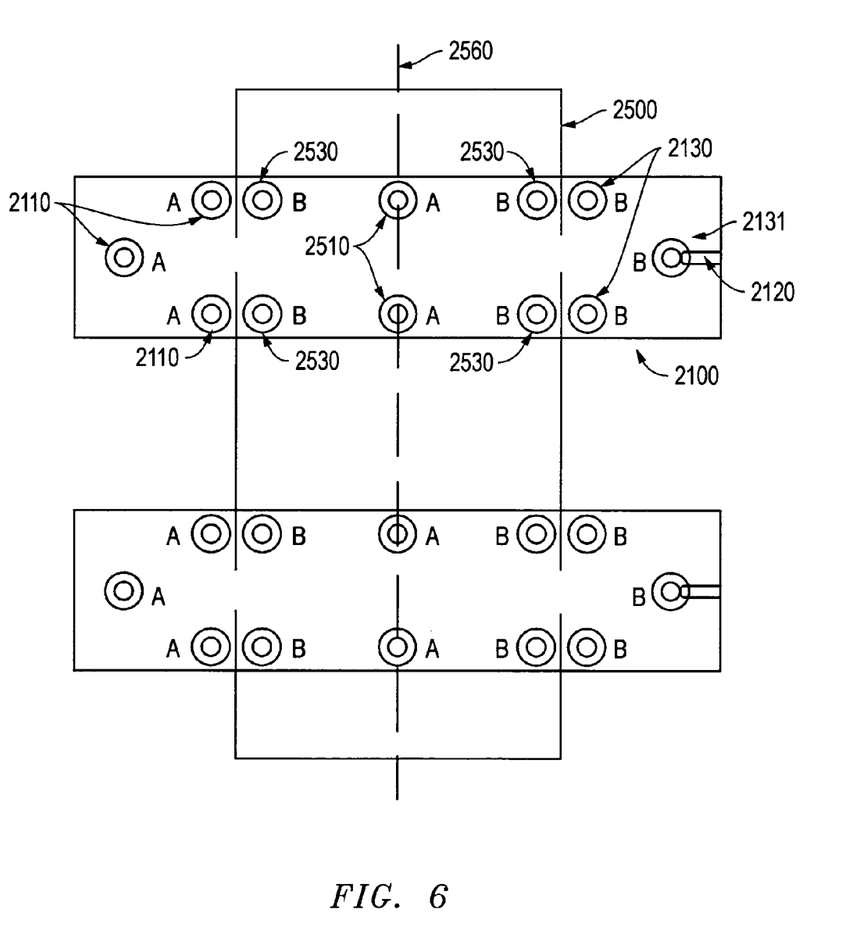
FIG. 6 is a top view of an embodiment of the present invention showing mounting of a coil assembly to thermal compensators.

FIG. 6 shows a top view of thermal compensators 2100 affixed to coil assembly 2500 by bolts inserted into bolt holes 2510 of type A and bolt holes 2530 of type B. Along a center line 2560, which passes through the center of both thermal compensators 2100, are two type A bolt holes 2510 for inserting bolts through the thermal compensators into coil assembly 2500, thereby affixing the thermal compensators 2100 to the coil assembly 2500. On each side of centerline 2560, are type B holes 2530 for inserting additional bolts through the thermal compensators into the coil assembly, to further secure the coil assembly to the compensators. However, type B holes 2530 exhibit an amount of clearance that allows for the difference in thermal expansion between the coil assembly and the compensator, as will be explained more fully with reference to FIG. 7.

Two bearing block assemblies on one side of coil assembly 2500 are mounted to thermal compensators 2100 by bolts inserted into type A bolt holes 2110 and two bearing block assemblies on the opposite of coil assembly 2500 are mounted to thermal compensators 2100 by bolts inserted into type B holes 2130 and 2131. Type B bolt hole 2131 enables lateral adjustment of a bolt inserted therein by way of a set screw 2120 as described above with reference to FIG. 5 for connecting a bearing block assembly 2000 to a thermal compensator 2100. This enables adjustment of the position of cam follower 2033 to facilitate contact of cam followers 2033 against surfaces 2403 of bearing rail structure 2400.

Figure 7A:
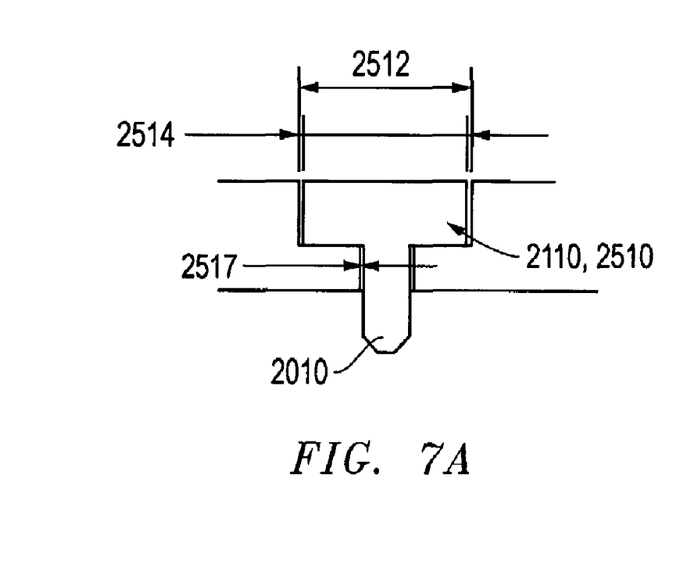
FIG. 7 show two types of bolt holes for mounting the linear motor and bearing block assemblies to thermal compensators.
Figure 7B:
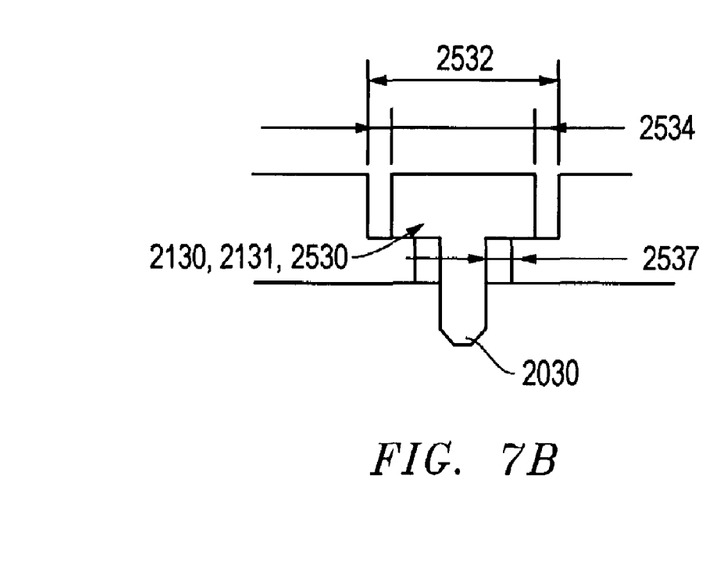

The difference between type A bolt holes 2110, 2510 and type B bolt holes 2130, 2131, 2530 is illustrated in FIG. 7. Type A bolt holes 2110, 2510 exhibit a radius 2512 that is just slightly larger than the radius 2514 of the head of a bolt 2010 inserted into bolt hole 2110, 2510. This presents a negligible gap 2517 so that there is essentially no lateral movement of bolt 2010 within bolt hole 2110, 2510. In contrast, type B bolt holes 2130, 2131, 2530 exhibit a radius 2532 that is significantly larger than the radius 2534 of the head of a bolt 2030 inserted into bolt hole 2130, 2131, 2530. This presents a gap 2537 that enables lateral movement of bolt 2030 within bolt hole 2130, 2131, 2530.

The type B bolt holes 2530 that extend into coil assembly 2500 enable thermal expansion of coil assembly 2500. When coil assembly 2500 expands laterally, the head of a bolt 2030 exhibiting a radius 2534 will move laterally within the region of bolt hole 2530 that exhibits radius 2532. Type B holes 2130, 2131 that extend into bearing block assemblies 2000 enable adjustment of the position of cam followers 2033 to ensure contact with surface 2403 of bearing rail structure 2400.

Figure 8:
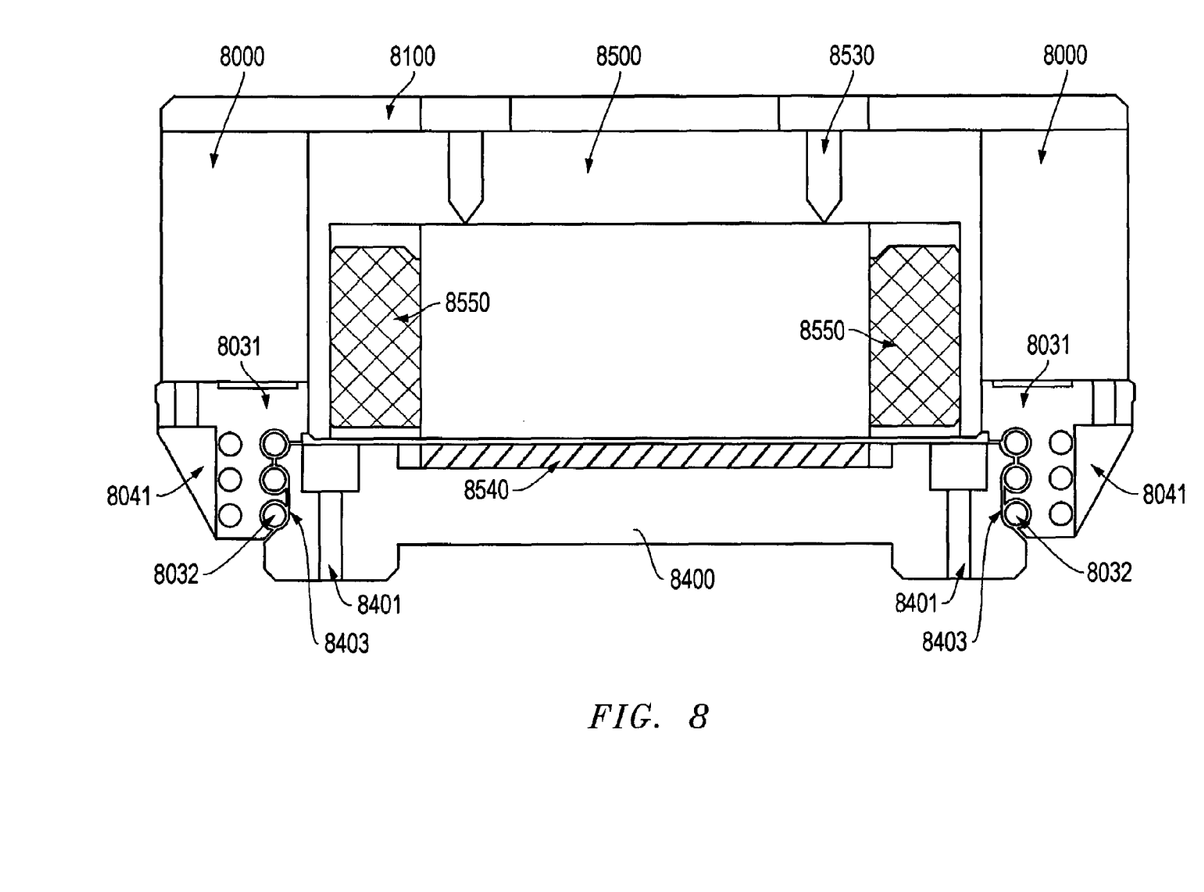
FIG. 8 shows a front cross sectional view of an alternative embodiment of the glide assembly of the present invention for mounting a iron core linear motor.

An alternative embodiment of the invention is shown in FIG. 8. An iron core motor assembly 8500, with iron cores 8550 is affixed to a thermal compensator 8100 with bolts inserted into bolt holes 8530. Also shown mounted to thermal compensator 8100, one on each side, are bearing blocks 8000. Mounted to a bearing block 8000 is a bearing assembly 8031 comprising roller bearings 8032, mounted by way of bolt holes 8041. A bearing rail structure 8400 exhibits surfaces 8403 that conform-ally mate to roller bearings 8032, which roll against surfaces 8403 to enable smooth linear motion of iron core motor assembly 8500. Mounted to bearing rail structure 8400 is a linear array of magnets 8540 for interacting with a magnetic field of iron core motor assembly 8500. Bolt holes 8401 are provided for mounting bearing rail structure 8400 to a base plate (not shown). Thus, bearing rail structure 8400 provides a unitary structure that exhibits bearing rails upon which iron core coil assembly 8500 will glide linearly, and provides a surface upon which magnets 8540 are disposed.

An iron core motor will typically generate heat in an aluminum or steel housing iron core assembly and exhibit thermal expansion. The motor assembly 8500 housing is made of steel or aluminum and acts as a heat sink to dissipate heat from iron core motor assembly 8500. An Invar thermal compensator 8100, in the embodiment of FIG. 8, produces insubstantial lateral motion of bearing block assemblies 8000, so that roller bearings 8032 substantially maintain contact with surfaces 8403 of bearing rail structure 8400.

Figure 9:
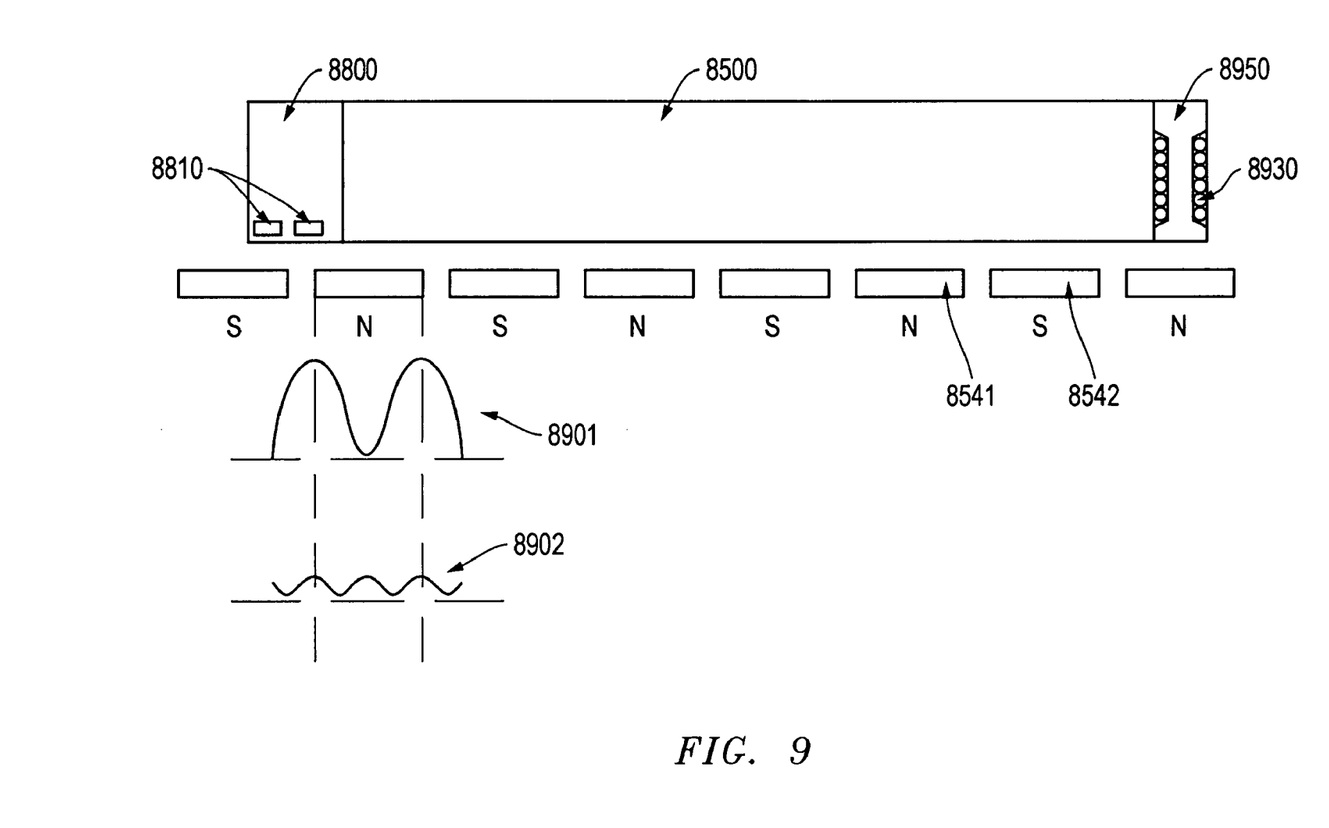
FIG. 9 shows an embodiment of the present invention for implementation of anti-cogging.

Shown in FIG. 9 is a side view of iron core motor assembly 8500 positioned over a linear array of magnets of alternating north polarity 8541 and south polarity 8542, the magnets being disposed upon a surface of the bearing rail structure of the present invention, as described above. At an end of iron core assembly 8500 is an electronics assembly 8800. Electronics assembly comprises sensors 8810 and associated electronics for use in position detection as described more fully in U.S. Pat. No. 6,326,908. Electronic assembly 8800 also provides for connection of electric current to the windings of iron core motor assembly 8500.

The invention provides for an anti-cog assembly 8950 comprising an iron core wrapped by coil windings 8930. Without anti-cog assembly 8950, a resistance to motion occurs when the ends of core assembly 8500 traverse over a transition between a north polarity magnet 8541 and a south polarity magnet 8542. The graph 8901 is indicative of the rise and fall, as a function of position, of the magnitude of this resistive force. This cyclical resistive force undesirably acts in opposition to the direction of linear motion of core assembly 8500, a phenomenon known in the art as cogging.

To reduce cogging, anti-cogging assembly 8950 is mounted to an end of iron core assembly 8500. In one embodiment coil 8930 is not connected to a current source. Rather, current is induced in the windings by magnetism creating a magneto-motive force that acts in partial opposition to the resistive cogging force. The resultant rise and fall of the cogging force as a function of the position of iron core assembly 8500 is indicated by the graph 8902, which shows that the amplitude of the cogging force is substantially diminished.

Figure 10:
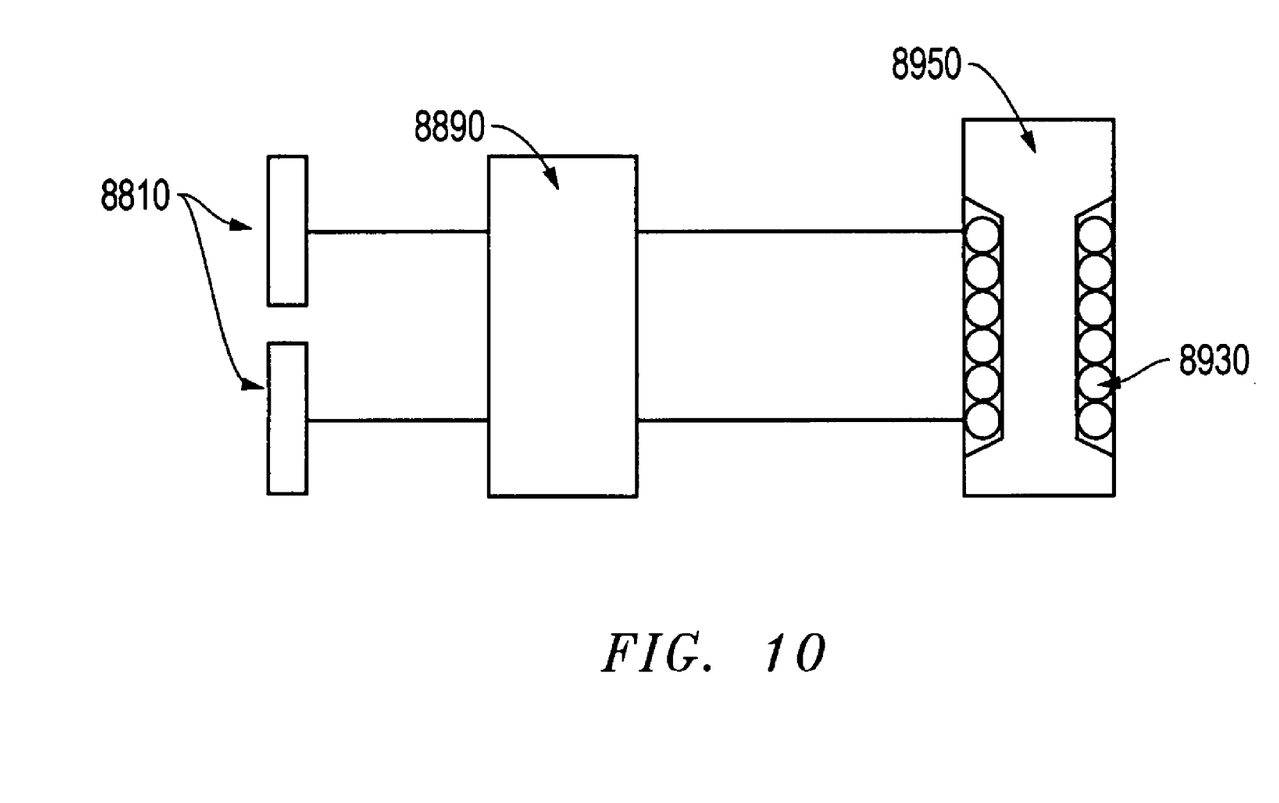
FIG. 10 shows a functional block diagram of a circuit for anti-cogging according to a method of the present invention.

In an alternative embodiment, coil 8930 of anti-cogging assembly 8950 is connected to a control circuit as shown in FIG. 10. Sensors 8810 produce signals indicative of the position of the iron core linear motor. These signals are received by electronics 8890, which provides a current to coil 8930 of anti-cogging assembly 8950. The current provided to coil 8930 is a function of the position of the linear motor and is calculated to create a magneto-motive force opposing and thereby substantially canceling the cogging force.

Although the present invention and its advantages have been described in detail, it should be understood that various changes, substitutions and alterations can be made herein without departing from the spirit and scope of the invention as defined by the appended claims. The invention achieves multiple objectives and because the invention can be used in different applications for different purposes, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A linear motor glide apparatus, comprising:
 a unitary bearing rail structure exhibiting a shallow channel with a width and a base, with an array of magnets disposed on the base of the channel, with outer side perimeters of the bearing rail structure forming bearing rail surfaces for receiving bearings to roll against the surfaces, with the shallow channel exhibiting a depth that is about equal to a thickness of the magnets, and with a bearing rail surface exhibiting a height that is substantially less than the width of the channel;
 bearing block assemblies comprising bearings position-able to roll against the bearing rail surfaces of the unitary bearing rail structure; and
 one or more connecting structures to which a plurality of the bearing block assemblies are mounted, the connecting structures adapted to mount a linear motor coil assembly above the channel when the bearings are positioned to roll against the bearing rail surfaces.

2. The apparatus of claim 1, wherein the one or more connecting structures is mounted to a bearing block assembly by a bolt inserted into a bolt hole with a radial clearance sufficient to enable adjustment of a position of a bearing of the bearing block assembly relative to a bearing rail surface exhibited by the bearing rail structure.

3. The apparatus of claim 1, wherein a mechanism for mounting the linear motor coil assembly to a connecting structure enables the linear motor coil assembly to exhibit an amount of thermal expansion, for a specified temperature increase, that substantially exceeds an amount of thermal expansion exhibited by the connecting structure for the specified temperature increase.

4. The apparatus of claim 1, wherein the bearing rail structure further comprises position indicator marks enabling detection by sensors of a position of the linear motor assembly.

5. The apparatus of claim 1, wherein the unitary bearing rail structure further comprises a ledge to mount a cover over the magnets disposed on the base of the channel.

6. The apparatus of claim 1, wherein a connecting structure mounts to the linear motor coil assembly by bolts in bolt holes exhibiting a radial clearance to accommodate thermal expansion of the linear motor coil assembly.

7. The method of claim 1, wherein a connecting structure mounts to the linear motor coil assembly by bolts in bolt holes exhibiting a radial clearance to accommodate thermal expansion of the linear motor coil assembly.

8. A method of constructing a linear motor assembly, comprising:
 providing a unitary bearing rail structure that exhibits a shallow channel with a width, and a base upon which an arry of magnets is disposed, with outer side perimeters of the bearing rail structure forming bearing rail surfaces for receiving bearings to roll against the surfaces, with the depth of the channel about equal to a thickness of the magnets, and a height of an outer side perimeter substantially less than the channel width;
 providing bearing block assemblies comprising bearings position-able to roll against the bearing rail surfaces of the bearing rail structure; and
 providing one or more connecting structures to which a plurality of the bearing block assemblies are mounted, the connecting structures adapted to mount a linear motor coil assembly above the channel when the bearings are positioned to roll against the bearing rail surfaces.

9. The method of claim 8, wherein one or more of the connecting structures conducts heat away from the linear motor coil assembly.

10. The method of claim 8, wherein one or more of the connecting structures exhibits, for a specified temperature range, a coefficient of thermal expansion that is substantially less than a coefficient of thermal expansion of a material which the linear motor coil assembly is comprised for the specified temperature range.

11. The method of claim 8, further comprising the step of providing an anti-cogging mechanism for reducing a cogging force exhibited by the linear motor.

12. The method of claim 8, further comprising an anti-cogging mechanism comprising a coil wrapped about a core, and wherein a current to reduce the cogging force is applied to the coil.

13. The method of claim 8, wherein the unitary bearing rail structure further comprises a ledge to mount a cover over the magnets disposed on the base of the channel.

14. The method of claim 8, wherein the unitary bearing rail structure further comprises position indicator marks enabling detection by sensors of a position of the linear motor assembly.

15. A method for reducing a cogging force exhibited by a linear motor, comprising the steps of:
 providing a unitary bearing rail structure that exhibits a surface upon which an array of magnets is disposed, the bearing rail structure exhibiting bearing rail surfaces for receiving bearings to roll against the surfaces;
 providing bearing block assemblies comprising bearings positioned to roll on the bearing rail surfaces of the bearing rail structure;
 providing one or more connecting structures adapted to affix a linear motor coil assembly thereto and to which a plurality of the bearing block assemblies are mounted;
 providing a core element positioned at an end of a core of the linear motor to move with the core; and
 windings wrapped around the core element so that current induced in the windings provides an anti-cogging force.

16. The method of claim 15, further comprising a current source to apply current to the windings to reduce the cogging force.

17. The method of claim 15, wherein a connecting structure mounts to the linear motor coil assembly by bolts in bolt holes exhibiting a radial clearance to accommodate thermal expansion of the linear motor coil assembly.

* * * * *